(12) United States Patent
Janke et al.

(10) Patent No.: US 11,247,191 B2
(45) Date of Patent: Feb. 15, 2022

(54) AMIDOXIME-FUNCTIONALIZED MATERIALS AND THEIR USE IN EXTRACTING METAL IONS FROM LIQUID SOLUTIONS

(71) Applicant: UT-Battelle, LLC, Oak Ridge, TN (US)

(72) Inventors: Christopher J. Janke, Oliver Springs, TN (US); Richard T. Mayes, Knoxville, TN (US); Sadananda Das, Kissimmee, FL (US); Sheng Dai, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 16/895,609

(22) Filed: Jun. 8, 2020

(65) Prior Publication Data

US 2020/0306724 A1    Oct. 1, 2020

Related U.S. Application Data

(62) Division of application No. 15/625,276, filed on Jun. 16, 2017, now Pat. No. 10,702,852.
(Continued)

(51) Int. Cl.
*B01J 20/26* (2006.01)
*C08F 255/02* (2006.01)
(Continued)

(52) U.S. Cl.
CPC ......... *B01J 20/265* (2013.01); *B01J 20/3085* (2013.01); *B01J 20/321* (2013.01);
(Continued)

(58) Field of Classification Search
CPC .... B01J 20/265; B01J 20/3085; B01J 20/321; B01J 20/3265; C02F 1/285;
(Continued)

(56) References Cited

U.S. PATENT DOCUMENTS 4,439,349 A    3/1984 Everett et al.
4,622,366 A *  11/1986 Sugo ................... C08F 8/32
                                            204/157.44
(Continued)

FOREIGN PATENT DOCUMENTS

CN    102614842 A    8/2012
WO    2014031702 A1  2/2014

OTHER PUBLICATIONS

Bicak, N. et al., "Atom Transfer Graft Copolymerization of 2-Ethyl Hexylacrylate from Labile Chlorines of Poly(vinyl chloride) in an Aqueous Suspension", Journal of Polymer Science Part A, (2005), pp. 1900-1907.
(Continued)

*Primary Examiner* — William K Cheung
(74) *Attorney, Agent, or Firm* — Scully, Scott, Murphy & Presser, P.C.

(57) ABSTRACT

A method of producing a functionalized material that extracts metal ions from solution, the method comprising: (i) providing a precursor material having nitrile groups appended to its surface; and (ii) reacting said nitrile groups with hydroxylamine or a derivative thereof in the presence of a polar aprotic solvent at a temperature of 60-80° C. for at least 1 hour, to convert at least a portion of said nitrile groups to amidoxime and imide dioxime groups, followed by reaction with a base capable of hydrolyzing any remaining nitrile groups to carboxylic acid groups; wherein said functionalized material has a higher uranium absorption capacity than a functionalized material produced under same conditions except that the nitrile groups are reacted with
(Continued)

hydroxylamine in only a protic solvent. The invention is also directed to functionalized materials produced by the above-described method, and methods for using the functionalized material for extracting metal ions from metal-containing solutions.

**6 Claims, 8 Drawing Sheets
(2 of 8 Drawing Sheet(s) Filed in Color)**

Related U.S. Application Data

(60) Provisional application No. 62/350,778, filed on Jun. 16, 2016.

(51) Int. Cl.

| | | |
|---|---|---|
| *B01J 20/30* | (2006.01) | |
| *B01J 20/32* | (2006.01) | |
| *C02F 1/28* | (2006.01) | |
| *D06M 14/10* | (2006.01) | |
| *D06M 11/38* | (2006.01) | |
| *D06M 14/28* | (2006.01) | |
| *D06M 13/368* | (2006.01) | |
| *D06M 10/00* | (2006.01) | |
| *D01F 6/46* | (2006.01) | |
| *C02F 101/00* | (2006.01) | |
| *C02F 103/08* | (2006.01) | |
| *D01D 5/247* | (2006.01) | |
| *C02F 101/20* | (2006.01) | |

(52) U.S. Cl.
CPC ....... *B01J 20/3217* (2013.01); *B01J 20/3265* (2013.01); *C02F 1/285* (2013.01); *C08F 255/02* (2013.01); *D01F 6/46* (2013.01); *D06M 10/008* (2013.01); *D06M 11/38* (2013.01); *D06M 13/368* (2013.01); *D06M 14/10* (2013.01); *D06M 14/28* (2013.01); *C02F 2101/006* (2013.01); *C02F 2101/20* (2013.01); *C02F 2103/08* (2013.01); *D01D 5/247* (2013.01)

(58) Field of Classification Search
CPC ............ C02F 2101/006; C02F 2101/20; C02F 2103/08; C08F 255/02; D01F 6/46; D06M 10/008; D06M 11/38; D06M 13/368; D06M 14/10; D06M 14/28
USPC .......................................... 526/688; 210/688
See application file for complete search history.

(56) References Cited

U.S. PATENT DOCUMENTS

| | | |
|---|---|---|
| 5,636,437 A | 6/1997 | Kaschmitter et al. |
| 5,776,633 A | 7/1998 | Mrotek et al. |
| 5,932,185 A | 8/1999 | Pekala et al. |
| 5,954,937 A | 9/1999 | Farmer |
| 6,214,204 B1 | 4/2001 | Gadkaree et al. |
| 6,309,532 B1 | 10/2001 | Tran et al. |
| 6,333,078 B1 | 12/2001 | Sugo et al. |
| 6,778,378 B1 | 8/2004 | Andelman |
| 7,449,165 B2 | 11/2008 | Dai et al. |
| 7,766,981 B2 | 8/2010 | Bourcier et al. |
| 7,835,137 B2 | 11/2010 | Kang et al. |
| 8,114,510 B2 | 2/2012 | Dai et al. |
| 9,249,241 B2 | 2/2016 | Dai et al. |
| 9,359,320 B2 | 6/2016 | Oyola et al. |
| 2013/0131275 A1 | 5/2013 | Tillman et al. |
| 2014/0206532 A1 | 7/2014 | Janke et al. |
| 2017/0326530 A1 | 11/2017 | Dai et al. |

OTHER PUBLICATIONS

Bicak, N. et al., "Graft Copolymerization of Butyl Acrylate and 2-Ethyl Hexyl Acrylate from Labile Chlorines of Poly (vinyl chloride) by Atom Transfer Radical Polymerization", Journal of Polymer Science Part A, (2003), pp. 3457-3462.
Das S. et. al., "Alternative Alkaline Conditioning of Amidoxime Based Adsorbent for Uranium Extraction from Seawater", Industrial & Engineering Chemistry Research 55:4303-4312 (2016).
Das, S. et al., "Chemical aspects of uranium recovery from seawater by amidoximated electron-beam-grafted polypropylene membranes", Desalination, (2008), vol. 23, pp. 243-253.
Das S. et. al., "Enhancing Uranium Uptake by Amidoxime Adsorbent in Seawater: An Investigation for Optimum Alkaline Conditioning Parameters", Industrial & Engineering Chemistry Research 55:4294-4302 (2016).
Das S. et. al., "Extracting Uranium from Seawater: Promising AF Series Adsorbents", Industrial & Engineering Chemistry Research 55:4110-4117 (2016).
Das S. et. al., "Extracting Uranium from Seawater: Promising AI Series Adsorbents", Industrial & Engineering Chemistry Research 55:4103-4109 (2016).
Das S. et. al., "Novel Poly(Imide Dioxime) Sorbents: Development and Testing for Enhanced Extraction of Uranium from Natural Seawater", Chemical Engineering Journal 298:125-135 (2016).
Gorka, J. et al., "Sonochemical functionalization of mesoporous carbon for uranium extraction from seawater", J. Mater. Chem. A., (2013), vol. 1, pp. 3016-3026.
Kang, S.O. et al., "Cyclic Imide Dioximes: Formation and Hydrolytic Stability", Industrial & Engineering Chemistry Research, (2012), vol. 51, pp. 6619-6624.
Kavakli, P. A. et al., "A Highly Efficient Chelating Polymer for the Adsorpotion of Uranyl and Vanadyl Ions at Low Concentrations", Adsorption, (2004), vol. 10, pp. 309-315.
Kuo L-J. et. al., "Characterization and Testing of Amidoxime-Based Adsorbent Materials to Extract Uranium from Natural Seawater", Industrial & Engineering Chemistry Research 55:4285-4293 (2016).
Ladshaw A.P. et al., "Experiments and Modeling of Uranium Uptake by Amidoxime-Based Adsorbent in the Presence of Other Ions in Simulated Seawater", Industrial & Engineering Chemistry Research 55:4241-4248 (2016).
Oyola Y. et. al., "Synthesis, Development, and Testing of High-Surface-Area Polymer-Based Adsorbents for the Selective Recovery of Uranium from Seawater", Industrial & Engineering Chemistry Research 55:4149-4160 Feb. 29, 2016.
Pan H. et. al., "Bicarbonate Elution of Uranium from Amidoxime-Based Polymer Adsorbents for Sequestering Uranium from Seawater", Chemistry Select 2:3769-3774 (2017).
Pan H. et. al., "Towards Understanding KOH Conditioning of Amidoxime-Based Polymer Adsorbents for Sequestering Uranium from Seawater", RSC Advances, 5:100715-100721 (2015).
Park J. et. al., "Effect of Biofouling on the Performance of Amidoxime-Based Polymeric Uranium Adsorbents", Industrial & Engineering Chemistry Research 55:4328-4338 (2016).
Percec, V. et al., Metal-Catalyzed Living Radical Graft Copolymerization of Olefins Initiated from the Structural Defects of Poly(vinyl chloride), Journal of Polymer Science Part A, (2001), pp. 1120-1135.
Rao, T.P. et al., "Preconcentration techniques for uranium(VI) and thorium(IV) prior to analytical determination—an over view", Talanta, (2006), vol. 68, pp. 1047-1064.
Saito, T. et al., "Uranium recovery from seawater: development of fiber adsorbents prepared via atom-transfer radical polymerization", J. Mater. Chem. A., (2014), pp. 14674-14681.
Vukovic, S. et al., How Amidoximate Binds the Uranyl Cation, Inorg. Chem. (2012), vol. 51, pp. 3855-3859.

\* cited by examiner

AMIDOXIME-FUNCTIONALIZED MATERIALS AND THEIR USE IN EXTRACTING METAL IONS FROM LIQUID SOLUTIONS

CROSS REFERENCE TO RELATED APPLICATION

The present application is a divisional of U.S. patent application Ser. No. 15/625,276 filed Jun. 16, 2017, now issued as U.S. Pat. No. 10,702,852, which claims benefit of U.S. Provisional Application No. 62/350,778, filed on Jun. 16, 2016, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention generally relates to the field of functionalized materials used in the extraction of metal ions from liquid solutions, and more particularly, to such materials having amidoxime functional groups.

BACKGROUND OF THE INVENTION

Fibrous adsorbents have been widely used for recovering metals from aqueous systems, such as seawater, fresh water, wastewater, drinking water, ultrapure water, and other less common types of waters, such as hot spring water and water rich in precious metals. Many of the fibrous adsorbents used for the extraction of metals have a polymeric backbone (trunk) with functionalized polymeric grafts extending out from the backbone, wherein the functional groups have metal-binding properties.

Amidoxime groups are often the functional groups of choice in many metal extraction technologies by virtue of their known higher metal adsorption (complexing) abilities compared to many other functional groups. Amidoxime groups are particularly adept in adsorbing heavy metals, such as uranium ions. Nevertheless, there would be a significant benefit in further improving the metal-binding abilities of amidoxime-containing compositions, particularly for those applications in which the concentration of the metal in solution is exceedingly low or where substantially complete removal is desired.

SUMMARY OF THE INVENTION

In one aspect, the invention is directed to an amidoxime-functionalized material useful in the absorption of metal ions from liquid (e.g., aqueous) solutions, produced according to the method described herein. The amidoxime-functionalized material also contains imide dioxime groups, which are believed to help facilitate absorption of metal ions from solution. The invention has made the unexpected finding that the metal absorption capacity of the amidoxime-functionalized material becomes improved when the amidoximation reaction to produce it is performed in the presence of a polar aprotic solvent, particularly a polar aprotic solvent having a boiling point of at least 100° C., as compared to when the amidoximation reaction is performed in only a protic solvent.

More specifically, the amidoxime-functionalized material is produced by a method in which a precursor material having nitrile groups on its surface undergoes an amidoximation reaction in which the nitrile groups of the precursor material are reacted with hydroxylamine or a derivative thereof in the presence of a polar aprotic solvent having a boiling point of at least 100° C., at a temperature of 60-80° C. for at least 1 hour, to convert at least a portion of the nitrile groups to amidoxime and imide dioxime groups, followed by reaction with a base capable of hydrolyzing any remaining nitrile groups to carboxylic acid groups. The resulting functionalized material has amidoxime and imide dioxime groups on its surface. The resulting functionalized material unexpectedly has a higher uranium absorption capacity than a functionalized material that is produced under the same conditions except that the nitrile groups are reacted with hydroxylamine or a derivative thereof in solely a protic solvent.

In another aspect, the invention is directed to a method for extracting metal ions from a liquid (e.g., aqueous) solution containing metal ions by contacting the liquid solution with the functionalized material described above. The metal ions being extracted can be any desired metal ions, but are more typically selected from transition, lanthanide, and actinide metals. In particular embodiments, the metal ion being extracted is uranium or other actinide element from contaminated water or from seawater. In other embodiments, the metal ion being extracted is a heavy metal contaminant that needs to be removed from a liquid solution.

The functionalized material described herein is particularly adept in extracting uranium from seawater. Increasing energy demands and uncertainty in fossil fuel-based energy sources are the main driving forces behind a resurgence of nuclear power among other alternative energy forms. The supply of uranium from terrestrial ores is limited and access can be further hindered through geopolitical activities. Alternative uranium reserves exist in the oceans, albeit in low concentrations (3.3 ppb) as the tricarbonato anion $[UO_2(CO_3)_3]^{4-}$ ((a) Davies, R. V., et al., *Nature*, 1964, 203 (495), 1110; and (b) Saito, K., et al., *Kagaku Kogaku Ronbunshu*, 1981, 7 (6), 545-548). The approximate 1.3 billion $km^3$ of water in the oceans contains a myriad of elements. Although many of the elements are in low concentrations (e.g., transition metals, lanthanides, and uranium), when combined with the vast quantity of seawater the low concentrations result in large untapped reserves. In view of rising energy demands, uranium reserves, such as seawater, nuclear fuel effluents, mine tailings, and others, have become alternative resources of interest (Rao, T. P., et al., *Talanta*, 2006, 68 (4), 1047-1064). Extracting uranium from seawater is challenging due to its low concentration and the large number of competing ions. The functionalized materials described herein are advantageously capable of extracting uranium with superior adsorption performance and selectivity, even in the presence of numerous other metal species.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE INVENTION

Figure 1:
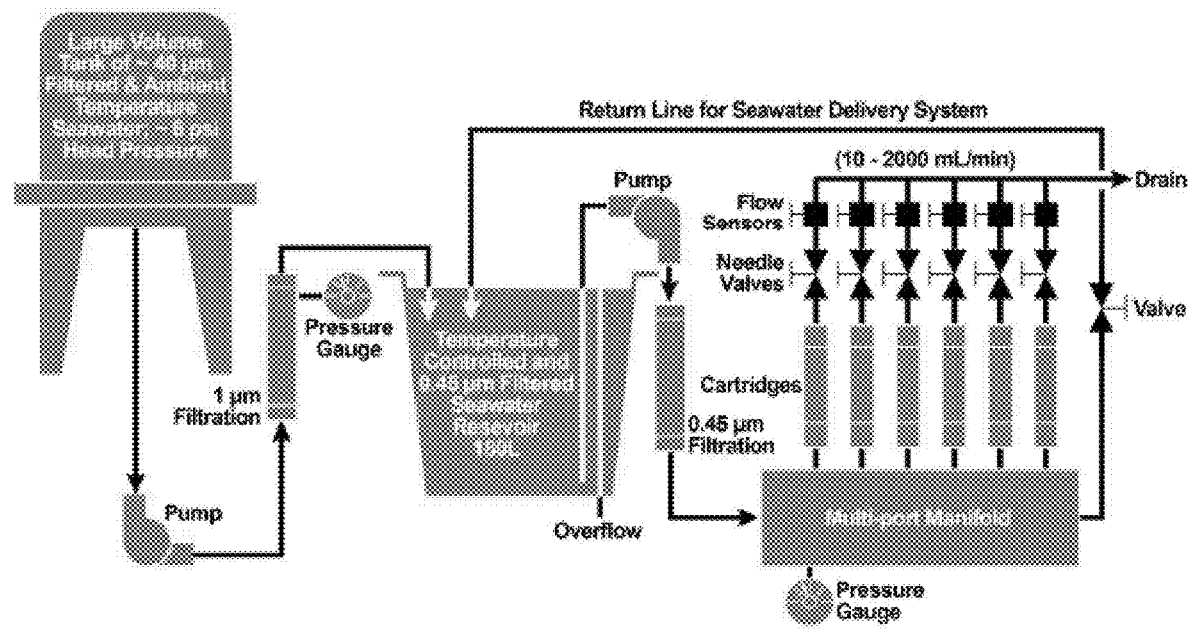
FIG. 1. Schematic diagram of a flow-through-column experiment using a parallel configuration for determination of uranium adsorption capacities of amidoxime-functionalized fiber adsorbents produced using different solvents in the amidoximation reaction.
Figures 2A, 2B, 2C, 2D, 2E, 2F:
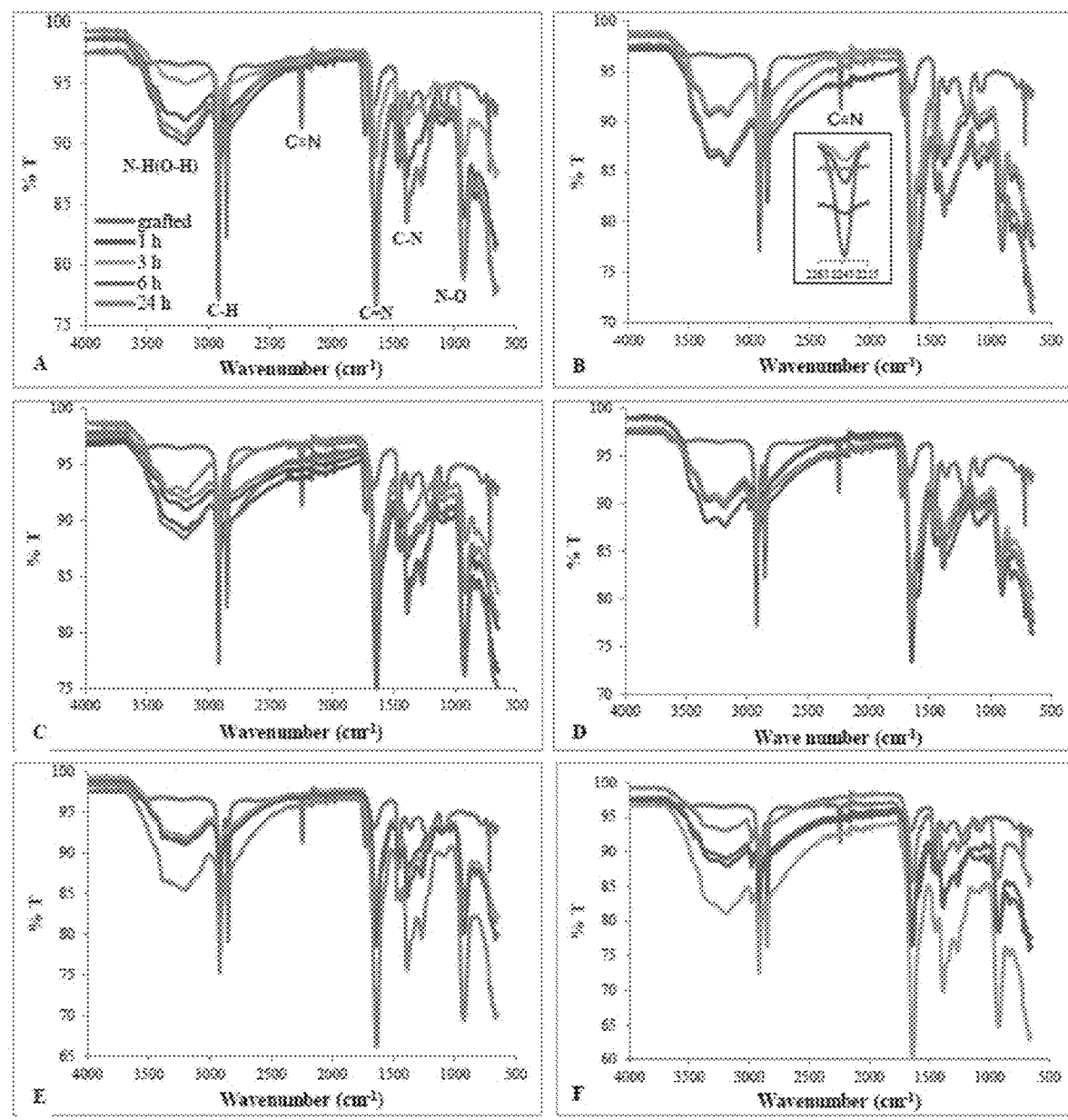
FIGS. 2A-2F. FTIR spectra of amidoxime-functionalized fiber adsorbents amidoximated with 10 wt % hydroxylamine at 80° C. in the following solvents: (A) H$_2$O, (B) CH$_3$OH, (C) 50:50 (w/w) H$_2$O—CH$_3$OH, (D) IPA, (E) DMSO, (F) 50:50 (w/w) H$_2$O-DMSO, for 1, 3, 6 and 24 hours of amidoximation reaction times for each solvent.

In one aspect, the invention is directed to methods for producing functionalized materials useful in the adsorption (or equivalently, absorption) of metal ions from liquid solutions. As indicated above, a key aspect of the method that endows the resulting functionalized material with superior metal absorption capacity is the use of a polar aprotic solvent in the amidoximation step. Depending on such factors as the amidoximation solvent, amidoximation time, and precursor composition, the functionalized material may have a uranium 21-day absorption capacity of at least 2.0, 2.2, 2.5, 2.8, 3.0, 3.2, or 3.5 g-U/kg. In some embodiments, the functionalized material has a uranium absorption capacity that is at least 0.1, 0.2, 0.3, 0.4, 0.5, 0.6, 0.7, 0.8, 0.9, or 1.0 g-U/kg greater than a functionalized material that is produced under the same conditions except that the nitrile groups are reacted with hydroxylamine or a derivative thereof in only a protic solvent. In other embodiments, the functionalized material has a uranium absorption capacity that is higher than (e.g., at least 5%, 10%, 15%, 20%, 25%, 30%, 40%, 45%, or 50% greater than) a functionalized material that is produced under the same conditions except that the nitrile groups are reacted with hydroxylamine or a derivative thereof in only a protic solvent.

In the method, a precursor material having nitrile groups appended to its surface is provided. The precursor material contains a substrate component and nitrile-containing component, wherein the nitrile-containing component comprises nitrile groups directly or indirectly bound to the surface of the substrate. The precursor material may be produced just prior to the amidoximation process, or the precursor material may be obtained, e.g., commercially. In some embodiments, the term "surface" refers to an outer surface of the precursor material, and in other embodiments, the term "surface" refers to both outer and inner surfaces, wherein the inner surfaces correspond to interior walls of pores or channels in the precursor material. The nitrile groups are also typically present within the bulk (core) of the material, i.e., below the surface and often through the entire volume of the material.

The precursor material can have nitrile groups directly or indirectly bound to its surface and core regions. An example of a precursor material having nitrile groups directly bound to its surface is polyacrylonitrile (PAN) and its co-polymeric derivatives, such as with acrylate or methacrylate co-monomers. In some embodiments, the precursor material is produced by graft polymerization of nitrile-containing vinylic monomers onto a substrate. The nitrile-containing vinylic monomer contains one or more (e.g., two or more) nitrile groups. As is well known, graft polymerization generally operates on the principle of generating radical active sites on a substrate followed by contact of vinylic monomers with the activated substrate to induce radical polymerization of the vinylic monomers on the substrate. The resulting graft polymers extend radially outward from the surface of the precursor material. As further discussed below, various well known approaches may be used to generate the radical active sites on the substrate.

In particular embodiments, the vinylic monomer has the general formula:

In Formula (1), R$^1$, R$^2$, R$^3$, and R$^4$ may be independently selected from hydrogen atom, hydrocarbon groups having at least 1 and up to 12 carbon atoms, halogen atoms, and nitrile-containing groups, wherein at least one of R$^1$, R$^2$, R$^3$, and R$^4$ is a nitrile-containing group. The hydrocarbon groups are typically alkyl, alkenyl, cycloalkyl, or aromatic groups, e.g., methyl, ethyl, n-propyl, isopropyl, n-butyl, isobutyl, sec-butyl, t-butyl, vinyl, allyl, cyclopentyl, cyclohexyl, phenyl, and benzyl. In some embodiments, only nitrile-containing vinylic monomers according to Formula (1) are included in the graft polymerization reaction. In other embodiments, one or more vinylic monomers other than a nitrile-containing monomer (i.e., one or more vinylic co-monomers) are included along with the nitrile-containing monomer, in which case the graft polymerization is a graft co-polymerization. The vinylic co-monomer can be according to Formula (1), except that an oxygen-containing hydrophilic group is typically present in place of a nitrile-containing group. The oxygen-containing hydrophilic group can be, for example, a carboxylic acid group (which includes carboxylate salts), carboxylic ester group, hydroxy group, ether group, amino group, amido group, sulfonic acid group, phosphonic acid group, keto group, or aldo group.

The nitrile-containing monomer can be, for example, acrylonitrile, methacrylonitrile, vinylidene cyanide, crotonitrile, chloroacrylonitrile, 2-cyanomethacrylate, or 2-cyanoethylacrylate, or a mixture of one or more of these monomers. The oxygen-containing hydrophilic monomer can be, for example, methacrylic acid, acrylic acid, 2-hydroxyethyl acrylate, itaconic acid, trans-aconitic acid, 2-hydroxyethyl methacrylate, fumaric acid, methylfumaric acid, allyl alcohol, polyethylene glycol acrylate, polyethylene glycol methacrylate, methyl acrylate, hydroxyethyl acrylamide, polyethylene glycol diacrylate, polyethylene glycol dimethacrylate, N-vinylpyrrolidone, acrylamide, vinylacetate, vinylphosphonic acid, vinylsulfonic acid, or pentaerythritol triacrylate, or a mixture of one or more of these monomers. In the case of a graft co-polymerization of a nitrile-containing monomer and an oxygen-containing hydrophilic monomer, the resulting co-polymer can be, for example, a block, random, or alternating co-polymer. In particular embodiments, acrylonitrile or methacrylonitrile is copolymerized with at least one of itaconic acid, trans-aconitic acid, fumaric acid, methylfumaric acid, methacrylic acid, or hydroxyethylacrylate.

The resulting vinyl-addition polymeric grafts on the precursor material can be represented by the following formula:

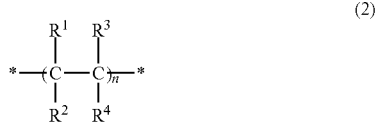

(2)

In Formula (2), the two asterisks represent connection points, with one of the connection points being a covalent bond between the substrate and vinyl-addition polymeric graft according to Formula (2) and the other connection point being a bond between the vinyl-addition polymeric graft according to Formula (2) and a terminating group. The subscript n in Formula (2) is generally an integer of at least 10. In different embodiments, n can be an integer of at least, above, up to, or less than, for example, 10, 15, 20, 25, 30, 35, 40, 45, 50, 100, 150, 200, 250, 300, 400, 500, 1000, 5000, or 10,000, or an integer within a range bounded by any two of the foregoing values. Each —C($R^1R^2$)—C($R^3R^4$)— moiety in Formula (2) corresponds to a vinylic unit.

The substituents $R^1$, $R^2$, $R^3$, and $R^4$ in Formula (2) are independently selected from hydrogen atom, hydrocarbon groups having at least 1 and up to 12 carbon atoms, halogen atoms, nitrile-containing groups, and oxygen-containing hydrophilic groups, provided that at least one of $R^1$, $R^2$, $R^3$, and $R^4$ is a nitrile-containing group in each or a portion of the vinylic units in the vinyl-addition polymeric graft according to Formula (2) in the precursor material. Notably, as at least a portion of the nitrile groups are ultimately converted to amidoxime and imide dioxime groups, then at least one of $R^1$, $R^2$, $R^3$, and $R^4$ is amidoxime in each or a portion of the vinylic units in the vinyl-addition polymeric graft according to Formula (2). In some embodiments, at least one of $R^1$, $R^2$, $R^3$, and $R^4$ is also an oxygen-containing hydrophilic group in each or a portion of the vinylic units in the vinyl-addition polymeric graft according to Formula (2). In some embodiments, the groups $R^1$, $R^2$, $R^3$, and $R^4$ are the same over all polymeric units n. In other embodiments, one or more of the groups $R^1$, $R^2$, $R^3$, and $R^4$ may be different over polymeric units n, in which case the vinyl-addition polymeric graft is copolymeric, such as a block, alternating, or random copolymer. Moreover, Formula (2) can represent a portion (e.g., a block of a copolymer) or the entire vinyl-addition polymeric graft. By necessity, the composition of Formula (2) has a terminating (capping) group, which may be any of the groups provided above for groups $R^1$, $R^2$, $R^3$, and $R^4$.

In some embodiments, two of $R^1$, $R^2$, $R^3$, and $R^4$ (e.g., $R^2$ and $R^4$) in Formula (2) can be crosslinked, either within a polymeric unit n (as in polybutyral or polycyclopentene) or between polymeric units to form a cyclic group. At least a portion of the R groups in Formula (2) are crosslinked as imide dioxime groups. In other embodiments, the vinyl-addition polymeric graft shown in Formula (2) can include a level of unsaturation by including a carbon-carbon double bond between the shown carbon atoms in the backbone (in which case two of $R^1$, $R^2$, $R^3$, and $R^4$ are removed from the formula to form a double bond) or by including a carbon-carbon double bond between carbon atoms of adjacent units (in which case one of $R^1$, $R^2$, $R^3$, and $R^4$ from one unit and one of $R^1$, $R^2$, $R^3$, and $R^4$ from another unit are removed from the formula to form a double bond between adjacent units).

In some embodiments, only a single vinylic monomer is used, in which case the resulting vinyl-addition polymeric graft is a homopolymer. In the case of a homopolymeric graft, each vinylic monomer from which the graft is derived includes at least a nitrile-containing group. The homopolymeric graft may or may not further include an oxygen-containing hydrophilic group, which may be introduced into the graft by using a vinylic monomer that contains both a nitrile-containing group and an oxygen-containing hydrophilic group.

In other embodiments, two or more vinylic monomers are used, in which case the resulting vinyl-addition polymeric graft is a copolymer. In the case of a copolymeric graft, at least one of the vinylic monomers from which the graft is derived includes a nitrile-containing group, while the at least one other vinylic monomer may contain a group that is not a nitrile group, and in particular, an oxygen-containing hydrophilic group, or a halogen-containing group, or a hydrocarbon group.

The substrate can be composed of any material that can form stable covalent bonds with nitrile groups or with linkers bound to nitrile groups. In a particular embodiment, the substrate has a polymer composition, which may be a co-polymer. The polymer can be, for example, a polyolefin (e.g., polyethylene or polypropylene), polyamide, polyester, polyvinyl alcohol, polyvinyl chloride, polytetrafluoroethylene-ethylene copolymer, polyacrylonitrile, halogenated polymer (e.g., chlorinated polymer, such as PVC or CPVC), or co-polymer or composite thereof. In another embodiment, the substrate has a carbon composition, such as any of the porous carbon, nanotube, graphene, or graphene oxide compositions known in the art.

In particular embodiments, the substrate has a polyolefin composition. The polyolefin composition may correspond to, for example, polyethylene, polypropylene, or polybutylene, or a copolymer thereof. In the case of polyethylene, the polyethylene can be any of the types of polyethylene known in the art, e.g., low density polyethylene (LDPE), linear low density polyethylene (LLDPE), very low density polyethylene (VLDPE), high density polyethylene (HDPE), medium density polyethylene (MDPE), high molecular weight polyethylene (HMWPE), and ultra-high molecular weight polyethylene (UHMWPE). In the case of polypropylene, the polypropylene can also be any of the types of polypropylenes known in the art, e.g., isotactic, atactic, and syndiotactic polypropylene. The polyolefin may also be derived from, or include segments or monomeric units of other addition monomers, such as styrene, acrylic acid, methacrylic acid, acrylate salt, methacrylate salt, acrylate ester, methacrylate ester, vinyl acetate (as well as partially or fully hydrolyzed derivatives of vinyl acetate, such as vinyl alcohol), terephthalate (e.g., as polyethylene terephthalate, or PET), acrylonitrile, and halogenated olefins (e.g., fluorinated, chlorinated, or brominated olefins), as found in, for example, polystyrene, polyacrylic acid, polyacrylonitrile, polyvinylfluoride, polyvinylidene fluoride, and polytetrafluoroethylene.

The precursor material (and hence, amidoxime-functionalized product) may have any suitable shape. In a particular embodiment, the precursor material has a fiber shape. The fiber can be a single fiber or a collection or bundle of fibers. The collection or bundle of fibers can be in the form of, for example, a woven or non-woven fabric, a braided fabric, a knitted fabric, mesh, or other textile form. The fibers may also be solid or tubular. In other embodiments, the precursor material is particulate, wherein the particles can be nanoparticles, microparticles, or macroscopic particles (e.g., in the millimeter size range, which corresponds to beads). In other embodiments, the precursor material has a planar type of shape, such as a sheet or film. In other embodiments, the precursor material has a block shape, such as a cube. The precursor material (and hence, amidoxime-functionalized product) may or may not also be porous, and more particularly, mesoporous, i.e., having pore sizes of at least or above 2 nm and up to or less than 50 nm. The precursor material may or may not also include micropores, i.e., pore sizes of less than 2 nm. The precursor material may or may not also include macropores, i.e., pores sizes of greater than 50 nm or 100 nm, and generally less than 1 micron (1 μm). In some cases, the porous material may also correspond to a foam.

In particular embodiments, the precursor material (and hence, amidoxime-functionalized product) is composed of fibers (i.e., is fibrous). The term "fiber," as used herein, refers to a structure having a length dimension at least 10, 20, 50, or 100 times longer than the other two dimensions. In some embodiments, the fiber has a diameter of at least or above 1 micron, such as a diameter of at least or above 1, 2, 3, 4, 5, 10, 20, 50, 100, 200, 300, 400, 500, or 1000 microns, or a diameter within a range bounded by any two of the above values. In other embodiments, the fiber has a diameter of up to or less than 1 micron, such as a diameter of up to or less than 1, 0.8, 0.5, or 0.25 microns. The fiber may also be solid across its diameter or it may be hollow. The fiber may have any possible shape, such as a cylindrical (i.e., circular) shape or polygonal shape on the outer surface or in an inner (hollow) portion of the fiber.

By a first approach, the substrate is activated by exposure to ionizing radiation before or during contact with the vinylic monomers to produce the nitrile-containing substrate. Such a process is generally referred to as a "radiation-induced graft polymerization" (i.e., RIGP) process. The ionizing radiation may be, for example, gamma ray radiation, electron beam radiation, or x-ray radiation, generally within about 10 kGy and about 500 kGy, inclusive. The irradiated material (typically a polymer) is generally sealed within an inert environment to preserve the free radicals prior to grafting. For example, the irradiated material can be sealed within a nitrogen environment, optionally at sub-zero temperatures, to prevent oxygen from reacting with the newly formed free radicals. While irradiation is typically conducted separately from graft polymerization, exposure to ionizing radiation can alternatively occur in the presence of the grafting monomers in liquid or vapor form while under inert conditions. For example, the method of the present invention can include simultaneously irradiating a high surface area polymeric material while in the presence of polymerizable monomers in liquid form. The RIGP process is described in further detail in, for example, U.S. Pat. No. 9,433,920, which is herein incorporated by reference in its entirety.

By a second approach, a surface-initiated atom-transfer radical polymerization (ATRP) process is used to produce the nitrile-containing substrate. In the ATRP process, a halogen-containing polyolefin is reacted in solution with one or more vinylic monomers under conditions conducive to ATRP. The conditions conducive to ATRP include contacting the halogen-containing material with the vinyl-functionalized monomers in solution in the presence of an ATRP catalyst. The ATRP catalyst can be any of the ATRP catalysts known in the art, typically a transition metal complex, such as a copper-containing catalyst (e.g., CuCl and/or $CuCl_2$) in the presence of a polydentate amino-containing ligand, such as tris(2-(dimethylamino)ethyl)amine ($Me_6$-TREN). The conditions conducive to ATRP may further include maintaining the reaction solution at an elevated temperature, such as a temperature of at least or above, for example, 30° C., 35° C., 40° C., 45° C., 50° C., 55° C., 60° C., 65° C., 70° C., 75° C., 80° C., 85° C., 90° C., 95° C., or 100° C., or a temperature within a range bounded by any two of these temperatures. The conditions and general methodology useful in conducting an ATRP process are all well known in the art, as evidenced by, for example, T. Saito et al., *J. Mater. Chem. A,* 2, pp. 14674-14681, 2014, the contents of which are herein incorporated by reference in their entirety.

By a third approach, a sonochemical grafting and polymerization process is used to produce the nitrile-containing substrate. In the sonochemical grafting and polymerization process, a base substrate (e.g., carbon or polymer) is sonicated at sufficient power in the presence of the vinyl monomer, a polymerization initiator, and a liquid solvent. The at least four aforesaid components are generally combined, either in parts or at once, and mixed by suitable means to form the reaction medium, which may be a slurry, emulsion, or solution. The reaction medium is sonicated at sufficient power to result in grafting and polymerization of the vinyl monomer onto the base substrate to produce the nitrile-containing precursor material. The sonochemical grafting and polymerization process is described in further detail in, for example, U.S. Pat. No. 9,249,241, which is herein incorporated by reference in its entirety.

The grafting and polymerization process can typically achieve a degree of grafting (i.e., grafting yield) of at least 25%. In different embodiments, the grafting yield is at least 30%, 40%, 50%, 60%, 75%, 100%, 120, 150, 200, 300, 400, 500, 600, 700, 800, 900, 1000, 1200, 1500, 1800, 2000, 2200, 2500, 2800, 3000, 3500, or 4000%.

In the method, the above-described precursor material containing nitrile groups is reacted with hydroxylamine or a derivative thereof to convert at least a portion of the nitrile groups to amidoxime groups and imide dioxime groups. The process is schematically depicted as follows:

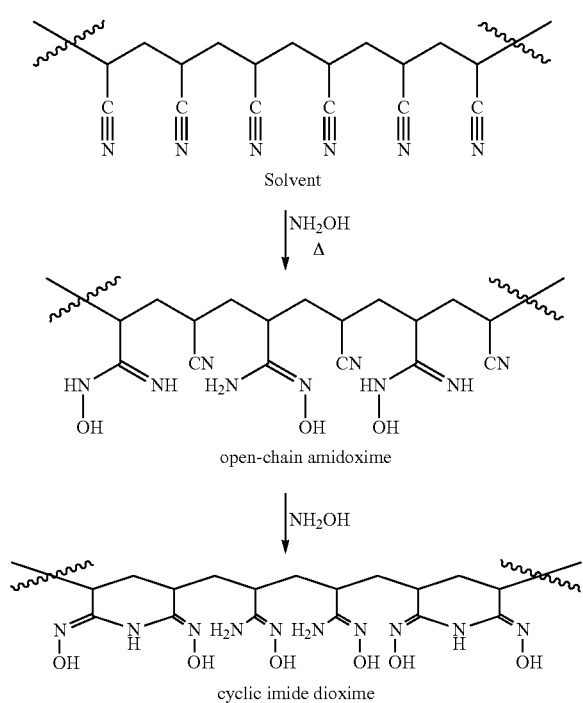

Although the term "hydroxylamine" generally refers to the formula NH$_2$OH, the term "hydroxylamine" may also refer to a hydroxylamine derivative, such as hydrazine, hydrazine derivatives, N-methylhydroxylamine, acetohydroxamic acid, N-benzylhydroxylamine hydrochloride, hydroxyurea, t-butyl N-hydroxycarbamate, N,N'-diphenylhydrazine, methylhydrazine sulfate, or phenylhydrazine. The nitrile groups are reacted with the hydroxylamine in the presence of a polar aprotic solvent typically having a boiling point of at least about 100° C. In some embodiments, the polar aprotic solvent has a boiling point of at least about 110, 120, 125, 130, 135, 140, or 150° C. By being "in the presence" of a polar aprotic solvent is meant that the hydroxylamine is dissolved in the polar aprotic solvent when the hydroxylamine reacts with the nitrile groups. Thus, the nitrile groups make contact with the hydroxylamine and solvent that the hydroxylamine is dissolved in. Generally, the polar aprotic solvent is a liquid at room temperature (i.e., about 20-30° C.). However, for purposes of the invention, the polar aprotic solvent may have a melting point within the temperature range that the amidoximation reaction is desirably conducted, e.g., a melting point of 35, 40, 45, 50, 55, 60, 65, 70, 75, or 80° C. Thus, the polar aprotic solvent may initially be a solid at room temperature and melted to function as a solvent at the time of the amidoximation reaction.

The polar aprotic solvent generally includes at least one oxygen atom, and often, additionally includes one or more nitrogen and/or sulfur atoms, all of which contribute to an overall dipole moment that renders the solvent polar. As well known in the art, the term "aprotic" indicates the absence of hydroxy (OH), thiol (SH), and carboxylic acid (COOH) groups. Thus, the polar aprotic solvent is not water, an alcohol (e.g., methanol, ethanol, n-propanol, isopropanol, and the like), or an organic or inorganic acid. The polar aprotic solvent should also not prevent the formation of or be reactive with the nitrile groups or resulting amidoxime or imide dioxime groups.

In a first exemplary set of embodiments, the polar aprotic solvent is a sulfoxide solvent. Some examples of sulfoxide solvents include dimethyl sulfoxide, ethyl methyl sulfoxide, diethyl sulfoxide, methyl propyl sulfoxide, and ethyl propyl sulfoxide.

In a second exemplary set of embodiments, the polar aprotic solvent is an amide solvent. Some examples of amide solvents include formamide, N,N-dimethylformamide, N,N-diethylformamide, acetamide, dimethylacetamide, diethylacetamide, gamma-butyrolactam, N-methylpyrrolidone (NMP), and hexamethylphosphoramide (HMPA).

In a third exemplary set of embodiments, the polar aprotic solvent is a ketone solvent. Some examples of ketone solvents include acetone, 2-butanone, and 1,3-dimethyl-3,4,5,6-tetrahydro-2(1H)-pyrimidinone (DMPU).

In a fourth exemplary set of embodiments, the polar aprotic solvent is a carbonate solvent. Some examples of carbonate solvents include propylene carbonate, ethylene carbonate, butylene carbonate, dimethyl carbonate, diethyl carbonate, dipropyl carbonate, ethyl methyl carbonate, methyl propyl carbonate, ethyl propyl carbonate, chloroethylene carbonate, and fluorocarbonate solvents (e.g., fluoroethylene carbonate and trifluoromethyl propylene carbonate).

In a fifth exemplary set of embodiments, the polar aprotic solvent is a sulfone solvent. Some examples of sulfone solvents include ethyl methyl sulfone, butyl sulfone, and ethyl phenyl sulfone.

In a sixth exemplary set of embodiments, the polar aprotic solvent is an ester solvent. Some examples of ester solvents include 1,4-butyrolactone, ethylacetate, ethylpropionate, propylpropionate, methylbutyrate, ethylbutyrate, ethyl formate, propyl formate, propylene glycol methyl ether acetate (PGMEA), and the fluorinated esters (e.g., mono-, di-, tri-, tetra-, penta-, hexa- and per-fluoro derivatives of any of the foregoing esters).

In a seventh exemplary set of embodiments, the polar aprotic solvent is a high boiling point ether solvent. Some examples of high boiling point ether solvents include diethylene glycol dimethyl ether (diglyme), triethylene glycol dimethyl ether (triglyme), tetraethylene glycol dimethyl ether (tetraglyme), and dioxane.

In some embodiments, one or more classes or specific types of polar aprotic solvents provided above are excluded from the amidoximation process. In other embodiments, two or more of the above classes or specific types of polar aprotic solvents are combined to provide a mixture of polar aprotic solvents.

In some embodiments, the hydroxylamine is dissolved solely in a polar aprotic solvent or a mixture of polar aprotic solvents, i.e., in the absence of a solvent that is not a polar aprotic solvent, such as in the absence of a protic solvent. In other embodiments, the hydroxylamine is dissolved in a polar aprotic solvent or mixture of polar aprotic solvents in admixture with one or more protic solvents (e.g., water or an alcohol, e.g., methanol, ethanol, n-propanol, or isopropanol). However, the one or more protic solvents should be in an amount of no more than 60 w/w % by total solvent weight. In different embodiments, one or more protic solvents are present in an amount of up to or less than, for example, 60, 55, 50, 45, 40, 35, 30, 25, 20, 15, 10, 5, 2, or 1 w/w % by total solvent weight. Thus, the polar aprotic solvent should be present in an amount of at least or above 40, 45, 50, 55, 60, 65, 70, 75, 80, 85, 90, 95, 98, 99, or 100 w/w %. Generally, as many of the non-polar hydrocarbon solvents (e.g., hexane, benzene, toluene, methylene chloride, or chloroform) would be immiscible or only partially soluble with the polar aprotic solvent, such non-polar hydrocarbon solvents are generally not included in the amidoximation reaction. Nevertheless, such a non-polar hydrocarbon solvent may be included, generally in an amount not exceeding 50, 40, 30, 20, 10, or 5 w/w % if the non-polar hydrocarbon solvent is completely miscible with the polar aprotic solvent in the stated amount.

In the amidoximation process, the precursor material is reacted with the hydroxylamine dissolved in the polar aprotic solvent at a temperature of 60-80° C. for at least 1 hour, to convert at least a portion of the nitrile groups to amidoxime and imide dioxime groups. In different embodiments, the temperature employed is about 60, 65, 70, 75, or 80° C. or a temperature within a range bounded by any two of these values. At any of these temperatures, the reaction is maintained at the given temperature or within a range of the given temperatures for a period of time of precisely or about, for example, 1, 1.5, 2, 2.5, 3, 3.5, 4, 4.5, 5, 5.5, 6, 6.5, 7, 10, 12, 15, 18, 20, 22, or 24 hours, or within a time period within a range bounded by any two of the times provided above. For example, in particular embodiments, the reaction is maintained within a range of the given temperatures for a period of time of 1-24 hours, 1-18 hours, 1-12 hours, 1-6 hours, 1-5 hours, 1-4 hours, 1-3 hours, 2-24 hours, 2-18 hours, 2-12 hours, 2-6 hours, 2-5 hours, 2-4 hours, 2-3 hours, 3-24 hours, 3-18 hours, 3-12 hours, 3-6 hours, 3-5 hours, 3-4 hours, 4-24 hours, 4-18 hours, 4-12 hours, or 4-6 hours. The end of the amidoximation process is marked by either or both of the following events: lowering of the temperature to less than 60° C. and/or reaction of the reaction components with a base (e.g., KOH or NaOH) capable of hydrolyzing any remaining nitrile groups to carboxylic acids. The latter hydrolysis step is also referred to as a conditioning step. In the process, generally at least 50%, 60%, 70%, 80%, 90%, or 95% of the nitrile groups (i.e., "at least a portion" of the nitrile groups) are converted to amidoxime and imide dioxime groups, thereby producing a functionalized material having amidoxime and imide dioxime groups on its surface(s) and generally also within the bulk (i.e., core) of the functionalized material. In some embodiments, by use of any of the above temperatures and reaction times, the resulting functionalized material contains imide dioxime groups present in a higher concentration as compared to a functionalized material produced by reacting the nitrile groups under the same amidoximation conditions except that a temperature of less than 60° C. is used and/or except that a polar aprotic solvent is not used.

In another aspect, the invention is directed to a method for extracting metal ions from a liquid solution containing metal ions. In the method, a metal-absorbing material, as described above, is contacted with the metal-containing liquid solution to bind metal ions onto surfaces of the metal-absorbing material. The solution can be contacted in any manner that promotes or maximizes the binding of one or more metal ions on the metal-absorbing material. The contact can be achieved by, for example, flowing the solution through a bundle, mesh, weave, or particles of the metal-absorbing material. In some embodiments, the metal-absorbing material is selective for one or more metal ions. In the latter embodiment, one or more specific types of metal ions (e.g., one or more lanthanides and/or actinides, such as uranium) are selectively absorbed, while one or more other metal ions are absorbed at a lower absorption capacity or not absorbed altogether. The solvent portion of the liquid solution containing the metal ions is typically aqueous-based, which may be solely water or water in admixture with one or more water-soluble organic solvents, such as an alcohol (e.g., methanol, ethanol, or isopropanol), acetone, acetonitrile, a sulfoxide, or amide solvent. However, in some embodiments, the solvent containing the metal ions may be substantially or completely non-aqueous, typically a polar protic or aprotic solvent.

In particular embodiments, the solvent containing the metal ions is substantially or completely composed of water. The metal-containing liquid solution can be, for example, seawater or wastewater (e.g., radioactive or other industrial waste) that contains metal ions. The metal-containing liquid may also be contaminated water that requires decontamination or purification to permit re-use.

The metal ions particularly considered herein are the transition, lanthanide, and actinide metal ions. The transition metals can be selected from first-row, second-row, and third-row transition metals. Some examples of first-row transition metal ions include Sc, Ti, V, Cr, Mn, Fe, Co, Ni, Cu, and Zn in their various oxidation states. Some examples of second-row transition metal ions include Y, Zr, Nb, Mo, Ru, Rh, Pd, Ag, and Cd in their various oxidation states. Some examples of third-row transition metal ions include Hf, Ta, W, Re, Ir, Pt, Au, and Hg in their various oxidation states. Some examples of lanthanide metal species include any of the elements in the Periodic Table having an atomic number of 57 to 71, e.g., La, Ce, Pr, Nd, Sm, Eu, Gd, Tb, Dy, Ho, Er, Tm, Yb, and Lu in their known oxidation states. Some examples of actinide metal species include any of the elements in the Periodic Table having an atomic number of 90 to 103, i.e., ions of Th, Pa, U, Np, Pu, and Am. In some embodiments, one or more actinide metals, or more specifically, uranium, is selectively absorbed over one or more other metal species (e.g., vanadium) in the metal-containing solution.

In some embodiments, the metal-absorbing material binds alkali, alkaline earth, and/or main group metal ions, if such metal ions are present in the solution being treated. In some embodiments, the metal-absorbing material is substantially incapable of binding to alkali, alkaline earth, and/or main group metal ions, or the metal-absorbing material binds such metals in a significantly lesser capacity by weight or moles than one or more transition, lanthanide, or actinide metal species, if such metal ions are present in the solution being treated. Some examples of alkali metal species include $Li^+$, $Na^+$, $K^+$, and $Rb^+$. Some examples of alkaline earth metal species include $Be^{2+}$, $Me^{2+}$, $Ca^{2+}$, and $Sr^{2+}$. Some examples of main group metal species (e.g., cations of Group IIIA-VIIA of the Periodic Table), include $B^{3+}$, $Al^{3+}$, $Ga^{3+}$, $In^{3+}$, $Tl^{1+}$, $Tl^{3+}$, $Sn^{4+}$, $Ge^{4+}$, $Sn^{2+}$, $Sn^{4+}$, $Pb^{2+}$, $Pb^{4+}$, $N^{3+}$, $P^{3+}$, $P^{5+}$, $As^{3+}$, $As^{5+}$, $Sb^{3+}$, $Sb^{5+}$, and $Bi^{3+}$. The metal ions are generally present as salts, such as halide (e.g., fluoride, chloride, bromide, or iodide), sulfate, nitrate, carbonate, phosphate, bicarbonate, hydroxide, carboxylate (e.g., acetate), oxide, and sulfide salts of any of the foregoing metal ions.

In some embodiments, any one or more of the above metals are preferentially adsorbed or are preferentially not adsorbed, or any one or more of the above metals are present in the metal-containing solution while one or more metals may not be present or may have been earlier removed. In particular embodiments, a metal-binding material is used for adsorption of metal ions selected from transition metal, lanthanide, and actinide metal ions, and more particularly, for the adsorption of uranium, particularly from seawater or wastewater.

Examples have been set forth below for the purpose of illustration and to describe certain specific embodiments of the invention. However, the scope of this invention is not to be in any way limited by the examples set forth herein.

EXAMPLES

Preparation of a Precursor Fiber Material by Radiation-Induced Graft Polymerization (RIGP)

High-surface-area polyethylene fibers (PE, hollow-gear) were prepared by bicomponent melt-spinning using polylactic acid (PLA) as the co-extrusion polymer. Prior to irradiation, the co-extruded PLA was removed from the fibers by treating with excess THF at 65-70° C., followed by drying at 40° C. under vacuum. The pre-weighed dry fiber samples, sealed inside double-layered plastic bags under nitrogen, were irradiated with an electron beam at a dose of approximately 200±10 kGy using 4.4-4.8 MeV electrons and 1 mA current from an electron beam machine. The irradiated fibers were immediately immersed in a 300-mL flask containing earlier de-gassed grafting solutions consisting of acrylonitrile (AN) and itaconic acid (ITA) in DMSO, and placed in an oven at 64° C. for grafting. After 18 hours of grafting, the fibers were washed with DMF to remove unreacted monomers and homopolymers followed by rinsing with methanol and drying at 40° C. under vacuum.

Amidoximation of the Grafted Acrylonitrile (AN)

The AN-grafted PE fibers (hereinafter, "AF1") were treated with 10 wt % hydroxylamine hydrochloride neutralized with KOH, for conversion into amidoxime (AO) groups. The amidoximated AN-grafted PE fibers are herein referred to as "amidoximated AF1 adsorbents." The hydroxylamine solution was prepared using a variety of solvents, such as de-ionized water, methanol, isopropanol (IPA), DMSO, 50/50 (w/w) water-methanol, 50/50 (w/w) water-IPA, 20/80 (w/w) water-THF, 50/50 (w/w) water-THF and 50/50 (w/w) water-DMSO. The amidoximation of AF1 with different hydroxylamine solutions was carried out at different temperatures (i.e., 60, 65, 70, 75 and 80° C.) for different periods of time (i.e., 1, 3, 6, and 24 hours). The samples were then washed under vacuum filtration with deionized water followed by drying at 40° C. under vacuum.

KOH Conditioning

The amidoximated AF1 adsorbents were conditioned with 0.44M KOH at 80° C. for 1 hour prior to exposing them in simulated seawater screening solution as well as real seawater for determining the uranium uptake capacity.

Simulated Seawater Screening

Batch experiments with synthetic seawater were conducted. The sodium-based brine solution used for screening consisted of 193 ppm sodium bicarbonate, 25,600 ppm sodium chloride, and 8 ppm uranium from uranyl nitrate hexahydrate in 18.2 MΩ cm$^{-1}$ water. The pH of the test solution was approximately 8. The concentrations of sodium, chloride, and bicarbonate ions were similar to those found in seawater. A sample of the solution was collected prior to the addition of adsorbent to determine the initial uranium concentration. Each of the KOH-conditioned AF1 samples (~15 mg) was then contacted with 750 mL of simulated seawater solution for 24 hours at room temperature with constant shaking at 400 rpm. After 24 hours of shaking, an aliquot was taken and the initial and final solutions were analyzed using inductively coupled plasma-optical emission spectroscopy. The uranium adsorption capacity was determined from the difference in uranium concentration in the solutions, using the following equation:

$$\text{Uranium }(U)\text{ adsorption capacity} = \left[\frac{\text{Initial }[U]\left(\frac{mg}{L}\right) - \text{Final }[U]\left(\frac{mg}{L}\right)}{\text{g of dry adsorbent}}\right] \times \text{Soln. vol. }(L)$$

The ICP-OES was calibrated using six standard uranium solutions with concentrations ranging from 0-10 ppm, which were prepared from 1000 ppm uranium in 5 wt % nitric acid stock solution, and a linear calibration curve was obtained. A blank solution of 2-3 wt % nitric acid was also prepared and washouts were monitored between samples to ensure no uranium was carried over into the next analysis. In addition, a solution of 5 ppm yttrium in 2 wt % nitric acid was used as an internal standard, which was prepared from 1000 ppm stock solution.

Field Adsorption Tests

Uranium adsorption kinetics and the uranium adsorption capacities for the AF1 adsorbents were conducted for 56 days in flow-through columns using natural seawater. FIG. 1 provides a schematic of the flow-through-column test used. The quality of seawater was quantitatively monitored for pH, temperature, salinity, and trace-metal concentrations over the whole exposure period. Marine testing was performed using filtered (0.45 µm) seawater at a temperature of 20±2° C. and at a flow rate of 250 mL/min, using an active pumping system. Glass wool and glass beads were used as packing materials in the columns.

Sample Handling and Analytical Procedures

The AF1 adsorbents (~50 mg each) were conditioned with 0.44 M KOH at 80° C. for 1 hour. The conditioned adsorbents were packed into columns (1" diameter, 6" long) fabricated from all plastic components, mostly polyvinylchloride (PVC) and polypropylene. Pre-cleaned glass wool and 5 mm glass beads were used to hold the adsorbents in place in the column. Ambient seawater was pumped from Sequim Bay, Wash. and filtered through 0.45 µm polypropylene cartridges for the continuous-flow adsorption experiment. The temperature of the incoming seawater was maintained at 20±1° C. using an all-titanium immersion-heater. The flow rate of seawater in each column was controlled at 250-300 mL·min$^{-1}$. Temperatures and flow rates were monitored at 10-minute intervals using a temperature logger equipped with a flexible hermetically sealed RTD sensor probe and an in-line turbine-style flow sensor, respectively. During the course of the flow-through adsorption experiments, seawater salinity and pH were monitored daily using a hand-held salinometer and pH meter. After 56 days of seawater exposure in the columns was completed, the adsorbents were removed from the columns and desalted by thoroughly rinsing with de-ionized water. The adsorbents were further dried using a heating block, and then weighed. The adsorbents loaded with metal ions were digested with a 50% aqua regia solution at 85° C. for 3 hours. Samples were further diluted with de-ionized water in order to be in the desired concentration range before analysis. Analysis of uranium and other trace elements in the digested solutions was conducted with an inductively coupled plasma optical emission spectrometer (ICP-OES), with quantification based on standard calibration curves.

Amidoximation and Characterization of Adsorbents

The grafted AF1 adsorbent fibers were treated with 10 wt % hydroxylamine hydrochloride neutralized with KOH, for conversion of AN into AO groups. The hydroxylamine solution was prepared in different types of solvents, such as de-ionized water, methanol, IPA, DMSO, 50/50 (w/w) water-methanol, 50/50 (w/w) water-IPA, 20/80 (w/w) water-THF, 50/50 (w/w) water-THF and 50/50 (w/w) water-DMSO. The amidoximation reaction with different hydroxylamine solutions was conducted at different temperatures (i.e., 60, 65, 70, 75 and 80° C.) for different periods of time (i.e., 1, 3, 6, 24 hours).

The Fourier Transform Infrared (FTIR) spectra of the amidoximated AF1 samples were recorded with a single-bounce diamond attenuated total reflectance (ATR) accessory at 2 cm$^{-1}$ resolution and averaged over 16 scans. The FTIR spectra of AF1 amidoximated with 10 wt % hydroxylamine in different solvents at 80° C. for different time-periods are shown in FIGS. 2A-2F. The FTIR spectra of amidoximated AF1 samples in FIG. 2A used $H_2O$ as a solvent in the amidoximation reaction for amidoximation reaction times of 1, 3, 6, and 24 hours. The FTIR spectra of amidoximated AF1 samples in FIG. 2B used $CH_3OH$ as a solvent in the amidoximation reaction for amidoximation reaction times of 1, 3, 6, and 24 hours. The FTIR spectra of amidoximated AF1 samples in FIG. 2C used 50:50 (w/w) $H_2O$—$CH_3OH$ as a solvent in the amidoximation reaction for amidoximation reaction times of 1, 3, 6, and 24 hours. The FTIR spectra of amidoximated AF1 samples in FIG. 2D used isopropanol (IPA) as a solvent in the amidoximation reaction for amidoximation reaction times of 1, 3, 6, and 24 hours. The FTIR spectra of amidoximated AF1 samples in FIG. 2E used 100% DMSO as a solvent in the amidoximation reaction for amidoximation reaction times of 1, 3, 6, and 24 hours. The FTIR spectra of amidoximated AF1 samples in FIG. 2F used 50:50 (w/w) $H_2O$-DMSO as a solvent in the amidoximation reaction for amidoximation reaction times of 1, 3, 6, and 24 hours.

In the FTIR spectra in FIGS. 2A-2F, the stretching frequency at ~2245 cm$^{-1}$ is representative of the C≡N group, and thus confirms grafting of acrylonitrile onto the polyethylene. The disappearance of the nitrile stretch and appearance of C=N (1650 cm$^{-1}$), C—N (1390 cm$^{-1}$), N—O (938 cm$^{-1}$) and N—H (or O—H) (3200-3400 cm$^{-1}$) clearly indicates the conversion of the nitrile to amidoxime (AO). It is interesting to note that the nitrile stretches disappeared even after 1 hour of amidoximation in all of the solvents, except in methanol (inset, FIG. 2B). The presence of the nitrile stretch even after 6 hours of amidoximation indicates that the reaction kinetics in methanol is slower than that in the other solvents.

Figures 3A, 3B:
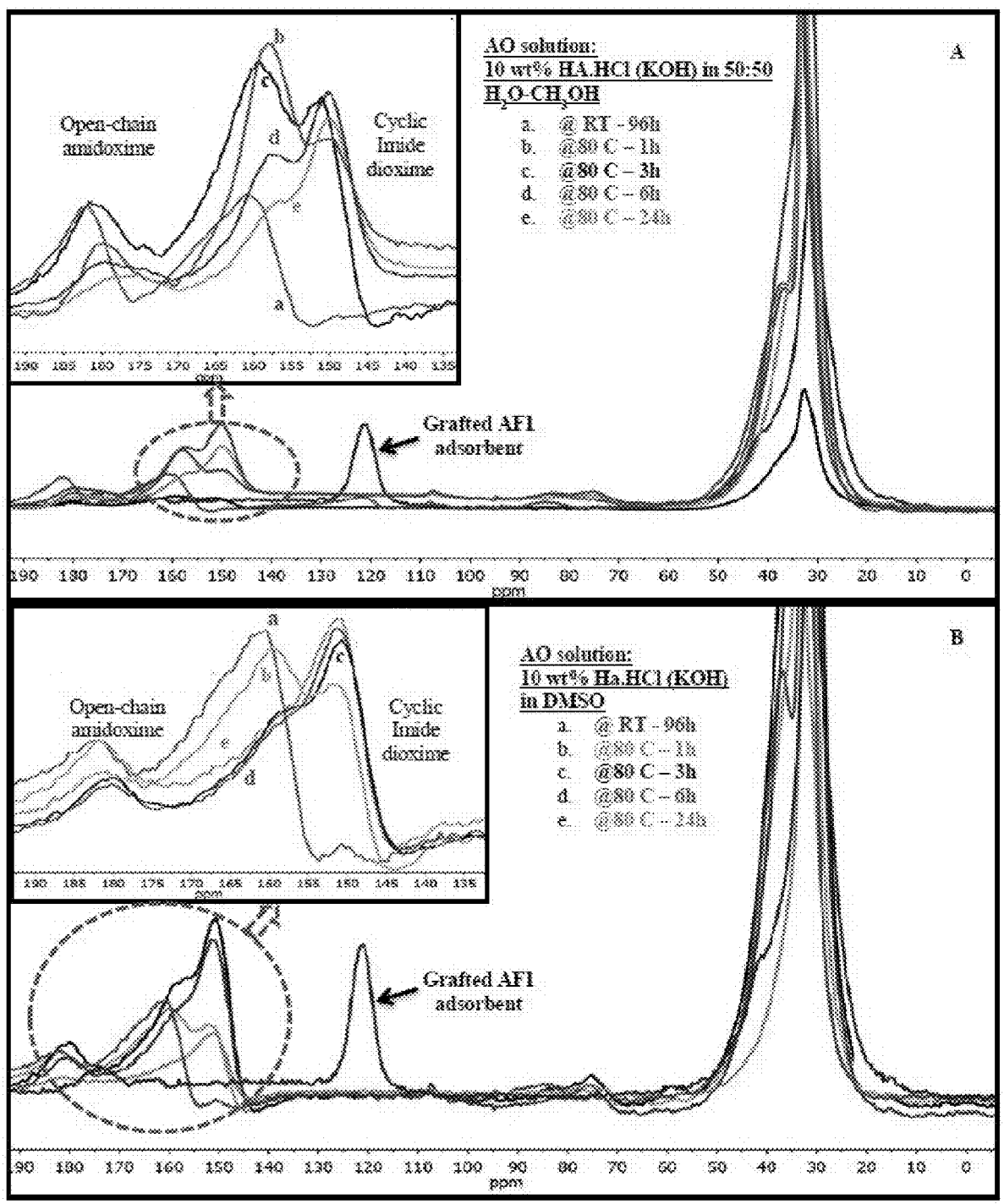
FIGS. 3A, 3B. $^{13}$C CP/MAS spectra of nitrile-grafted (AF1) adsorbent, and AF1 adsorbent amidoximated with 10 wt % hydroxylamine at room temperature (for 96 hours) and 80° C. (for 1, 3, 6 and 24 hours) in (A) 50:50 (w/w) H$_2$O—CH$_3$OH, and (B) DMSO.

The $^{13}C$ CP/MAS spectra of AF1 adsorbent fibers are illustrated in FIGS. 3A and 3B. FIG. 3A shows the $^{13}C$ CP/MAS spectra of nitrile-grafted AF1 adsorbent and AF1 adsorbent amidoximated with 10 wt % hydroxylamine at room temperature (for 96 hours) and at 80° C. (for 1, 3, 6 and 24 hours) in 50:50 (w/w) $H_2O$—$CH_3OH$. FIG. 3B shows the $^{13}C$ CP/MAS spectra of nitrile-grafted AF1 adsorbent and AF1 adsorbent amidoximated with 10 wt % hydroxylamine at room temperature (for 96 hours) and at 80° C. (for 1, 3, 6 and 24 hours) in DMSO. The signals at 120 ppm and 176 ppm are assigned to C≡N (i.e., acrylonitrile) and COO$^-$ (i.e., itaconic acid), respectively, grafted onto polyethylene. The signals at 157 and 149 ppm, ascribed to open-chain amidoxime and cyclic imide dioxime respectively, were observed (Y. Kobuke, et al., *Polym. J.,* 1990, 22, 179; T. Kawakami, et al., *Transaction of the Materials Research Society of Japan,* 2002, 27, 783). The signal at 120 ppm completely disappeared after amidoximation in both of the above solutions at 80° C. The incomplete disappearance of the signal at 120 ppm upon treatment in 50:50 (w/w) $H_2O$—$CH_3OH$ at room temperature for 96 hours indicates that the kinetics of the amidoximation reaction is slower in the $H_2O$—$CH_3OH$ solution as compared to DMSO. The presence of the signal at 157 ppm with a small hump at 149 ppm confirms the fact that mostly open-chain amidoxime formed after 96 hours of amidoximation reaction at room temperature. The gradual increase in intensity of the 149 ppm signal and the gradual decrease of the 157 ppm signal intensity (inset in FIGS. 3A and 3B) with increasing amidoximation time indicates the formation of cyclic imide dioxime by the reaction of amidoxime with adjacent cyano groups and hydroxylamine. Of additional note, there is a small chemical shift observed in the carboxyl group (COO$^-$) of itaconic acid from 176 to ~180 ppm.

Performance of Adsorbents for Uranium Adsorption

Figures 4A, 4B:
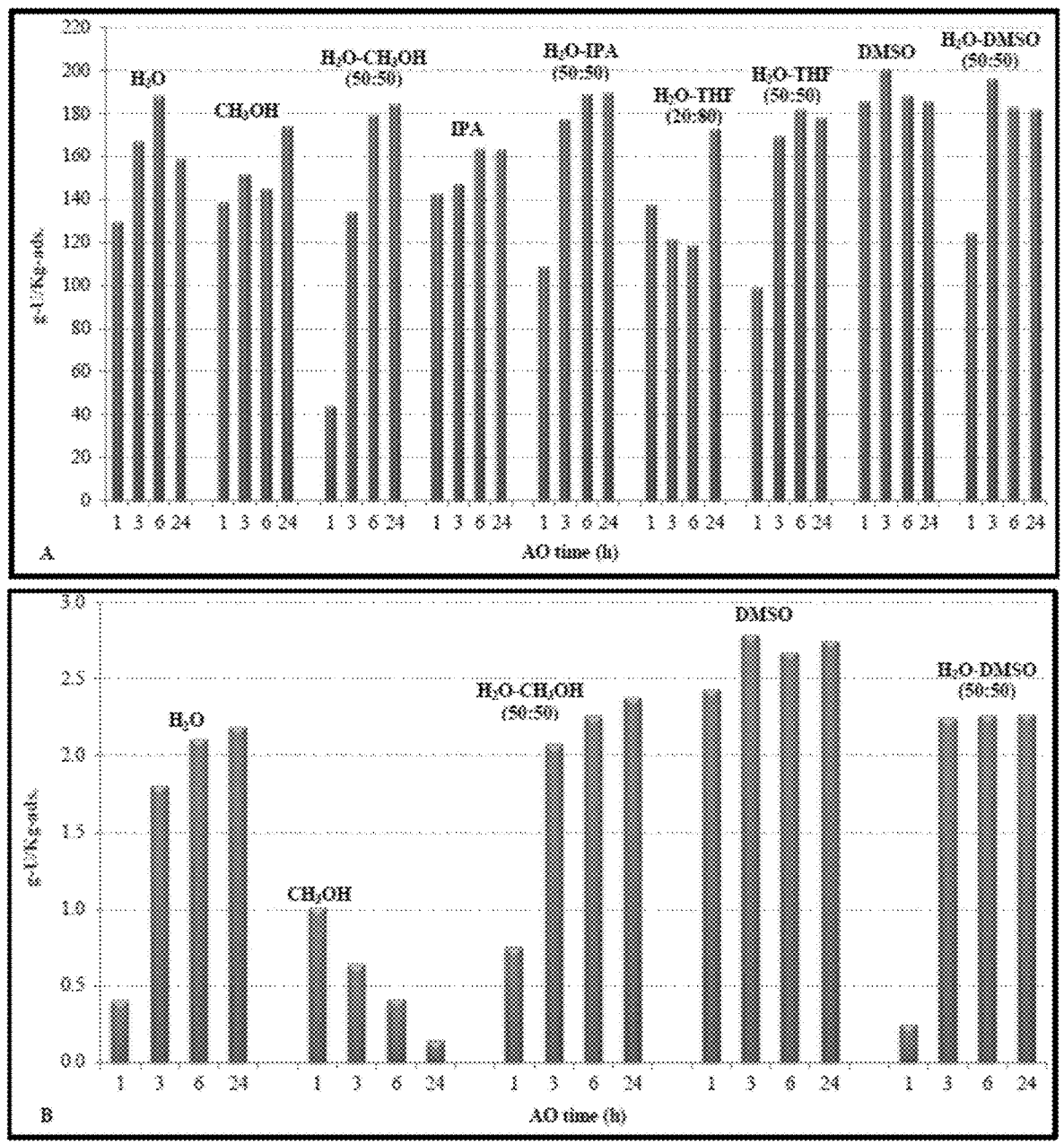
FIGS. 4A, 4B. Graphs showing uranium adsorption performance of AF1 adsorbent amidoximated with 10 wt % hydroxylamine in different solvents for different time periods at 80° C.: (A) after contacting with simulated seawater (spiked with uranium) for 24 hours, (B) after 21 days exposure with seawater (Sequim Bay) in flow-through columns.

The uranium adsorption studies of the AF1 adsorbent amidoximated with 10 wt % hydroxylamine in different solvents for different time periods at 80° C., after 24 hours of contact with the Na-based simulated seawater solution spiked with 8 ppm uranium, were conducted after conditioning with 0.44M KOH at 80° C. for 1 hour. As illustrated in FIG. 4A, for simulated seawater, the uranium adsorption capacity increases with increasing time of amidoximation reaction in $H_2O$, $CH_3OH$, 50:50 (w/w) $H_2O$—$CH_3OH$, IPA, 50:50 (v/v) $H_2O$-IPA and 50:50 (w/w) $H_2O$-THF. The highest uranium adsorption was observed for the adsorbent amidoximated in DMSO and 50:50 (v/v) $H_2O$-DMSO for 3 hours at 80° C. The adsorbent samples were tested for their performance in flow-through-column tests with filtered seawater from Sequim Bay. The uranium adsorption after 21 days exposure with seawater in the flow-through-column are shown FIG. 4B. As shown in FIG. 4B, the uranium adsorption capacity gradually increases with increasing amidoximation time in $H_2O$ and 50:50 (v/v) $H_2O$—$CH_3OH$ at 80° C. The uranium uptake after 21 days was higher for the samples amidoximated in 50:50 (w/w) $H_2O$—$CH_3OH$ than that in $H_2O$ alone. On the other hand, the uranium adsorption capacity gradually decreased with increasing amidoximation time in $CH_3OH$. Kawakami et. al. (supra) reported that the ratio of production of imide dioxime over amidoxime was higher for the reaction of cyano group with hydroxylamine in $H_2O$—$CH_3OH$ as compared to that in $CH_3OH$. Hence, the factors responsible for the low uranium adsorption of the AF1 sample amidoximated with $CH_3OH$ may be (i) incomplete conversion of nitrile (FIG. 2B), (ii) less amount of imide dioxime and (iii) probable chemical degradation of the adsorbent at longer reaction times. However, it is interesting to note that the AF1 samples amidoximated in DMSO resulted in the highest uranium adsorption capacity. This result was also consistent with the simulated seawater screening tests. Higher diffusivity of the DMSO solvent as compared to $H_2O/CH_3OH$, from the surface to the core of the grafted hollow-gear trunk PE fiber results in: (i) faster kinetics of the amidoximation reaction and (ii) larger amounts of cyclic imide dioxime throughout the adsorbent. Based on all of the above results, one can conclude that the imide dioxime may be responsible either directly or indirectly for the enhanced uranium adsorption.

Figures 5A, 5B:
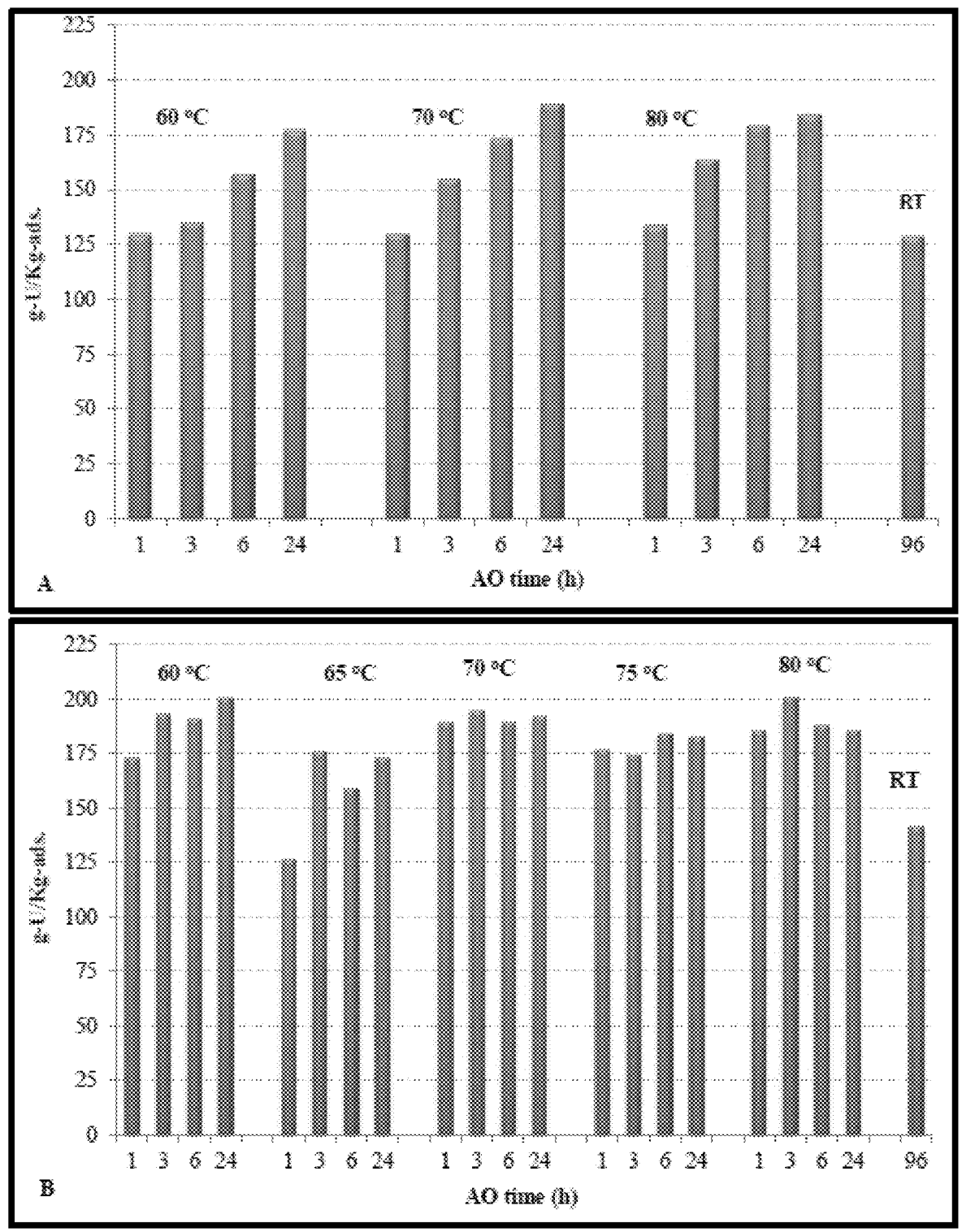
FIGS. 5A, 5B. Graphs showing uranium adsorption performance of amidoximated AF1 adsorbent after contacting with simulated seawater (spiked with uranium) for 24 hours. The adsorbents were amidoximated with 10 wt % hydroxylamine at different temperatures for different time periods in the following solvents: (A) 50:50 (w/w) H$_2$O—CH$_3$OH and (B) DMSO.

The next experiments investigated the amidoximation conditions for the AF1 adsorbents by selecting 50:50 (w/w) $H_2O$—$CH_3OH$ as the standard reference solvent and DMSO as the preferred solvent. The grafted AF1 adsorbent was treated with 10% hydroxylamine in 50:50 (w/w) $H_2O$—$CH_3OH$ and DMSO at different temperatures (60-80° C.) for 1, 3, 6, and 24 hours and at room temperature for 96 hours. The uranium adsorption capacities for the amidoximated AF1 adsorbents after 24 hours of contact with the Na-based simulated seawater solution that was spiked with 8 ppm uranium and conditioned with 0.44M KOH at 80° C. for 1 hour are shown in FIGS. 5A and 5B, wherein FIG. 5A shows the results for the amidoximated AF1 adsorbent produced by amidoximating in 50:50 (w/w) $H_2O$—$CH_3OH$ and FIG. 5B shows the results for the amidoximated AF1 adsorbent produced by amidoximating in DMSO. As shown, the uranium adsorption capacity gradually increased with an increase of reaction time in 50:50 (w/w) $H_2O$—$CH_3OH$ solvent in the temperature range of 60-80° C. Interestingly, the adsorbents amidoximated in DMSO exhibited higher uranium uptake but without any definite adsorption trend. On the other hand, the adsorbent amidoximated at room temperature adsorbed low amounts of uranium most likely due to: (i) incomplete conversion of CN and (ii) the presence of only open-chain amidoxime (as shown previously in FIGS. 3A, 3B).

Figures 6A, 6B:
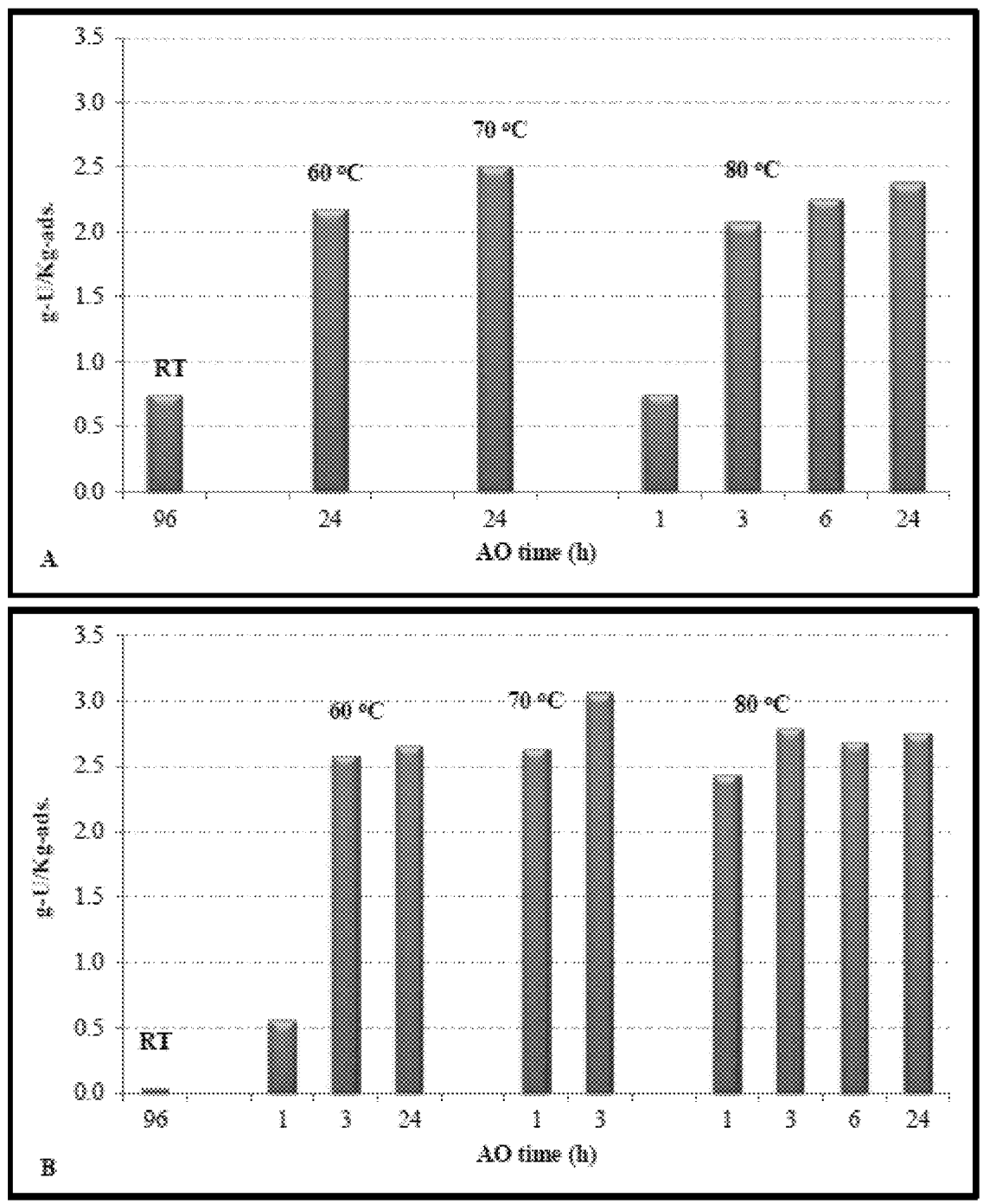
FIGS. 6A, 6B. Graphs showing uranium adsorption performance of amidoximated AF1 adsorbent after 21 days exposure with seawater (Sequim Bay) in flow-through columns. The adsorbents were amidoximated with 10 wt % hydroxylamine at different temperatures for different time periods in the following solvents: (A) 50:50 (w/w) H$_2$O—CH$_3$OH and (B) DMSO.

Some selected samples from the above experiments were tested in flow-through-columns. The uranium adsorption capacity results from 21 days of seawater exposure in flow-through-columns are shown in FIGS. 6A and 6B. As shown, the uranium adsorption capacities for the room temperature amidoximated samples were very low. For samples amidoximated in 50:50 (w/w) $H_2O$—$CH_3OH$ solvent (FIG. 6A), the uranium adsorption increases with reaction temperature and reaction time; and a temperature of 70° C. seems to be optimum (FIG. 6A). For samples amidoximated in DMSO (FIG. 6B), the uranium adsorption increases with reaction time and reaction temperature up to 70° C. (FIG. 6B). The highest uranium adsorption capacity (~3.06 g-U/Kg-ads.) for the AF1 adsorbent after amidoximation in DMSO was achieved at 70° C. for 3 hours.

Figures 7A, 7B:
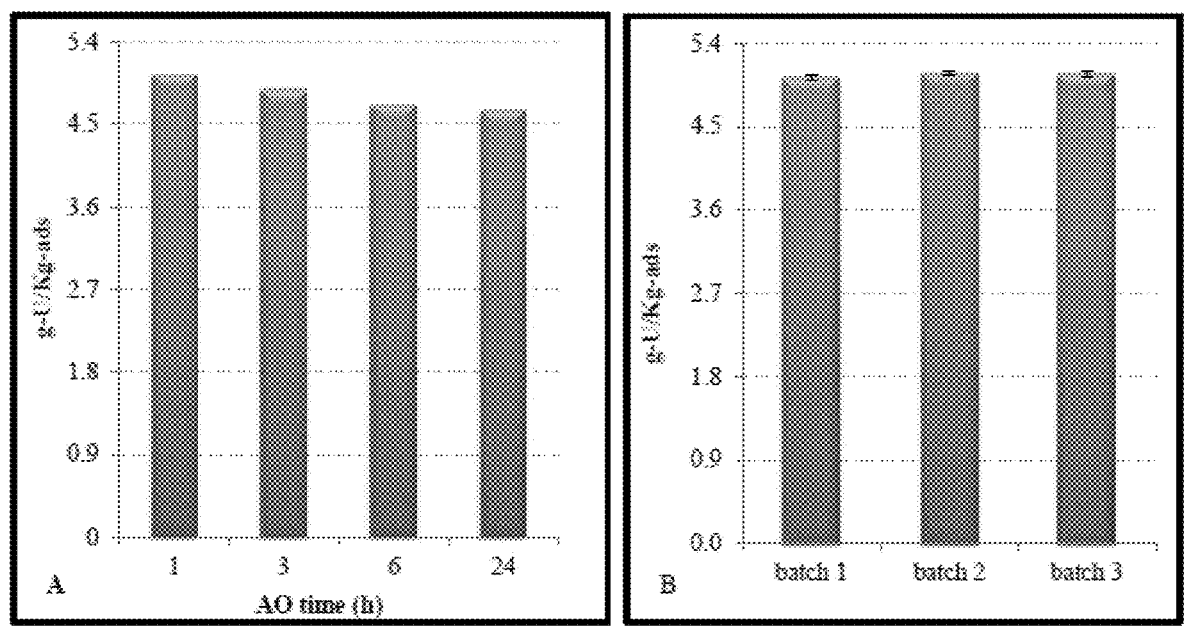
FIGS. 7A, 7B. Graphs showing uranium adsorption performance of amidoximated AF1 adsorbent after 56 days exposure with seawater (Sequim Bay) in flow-through columns. The adsorbents were amidoximated with 10 wt % hydroxylamine in DMSO at: (A) 80° C. for different time periods and (B) 70° C. for 3 hours.

Four AF1 samples were amidoximated in DMSO at 80° C. for 1, 3, 6 and 24 hours, with the uranium adsorption capacity results in seawater provided in FIG. 7A. Three AF1 samples amidoximated in DMSO at 70° C. for 3 hours (in different batches) were tested by subjecting them to 56 days exposure in flow-through-column tests, with the uranium adsorption capacity results in seawater provided in FIG. 7B. As can be observed from FIG. 7A, the uranium adsorption capacities for the adsorbents that were amidoximated in DMSO at 80° C. gradually decrease with increasing amidoximation time, with the highest uranium adsorption of 5.04 g-U/Kg-ads after 1 hour of amidoximation. On the other hand, as can be observed from FIG. 7B, the samples that were amidoximated in DMSO at 70° C. for 3 hours adsorbed the highest amount of uranium (5.06±0.025 g-U/Kg-ads.) after 56 days of exposure in seawater in the flow-through-columns.

Kinetics of Uranium Adsorption

Figure 8:
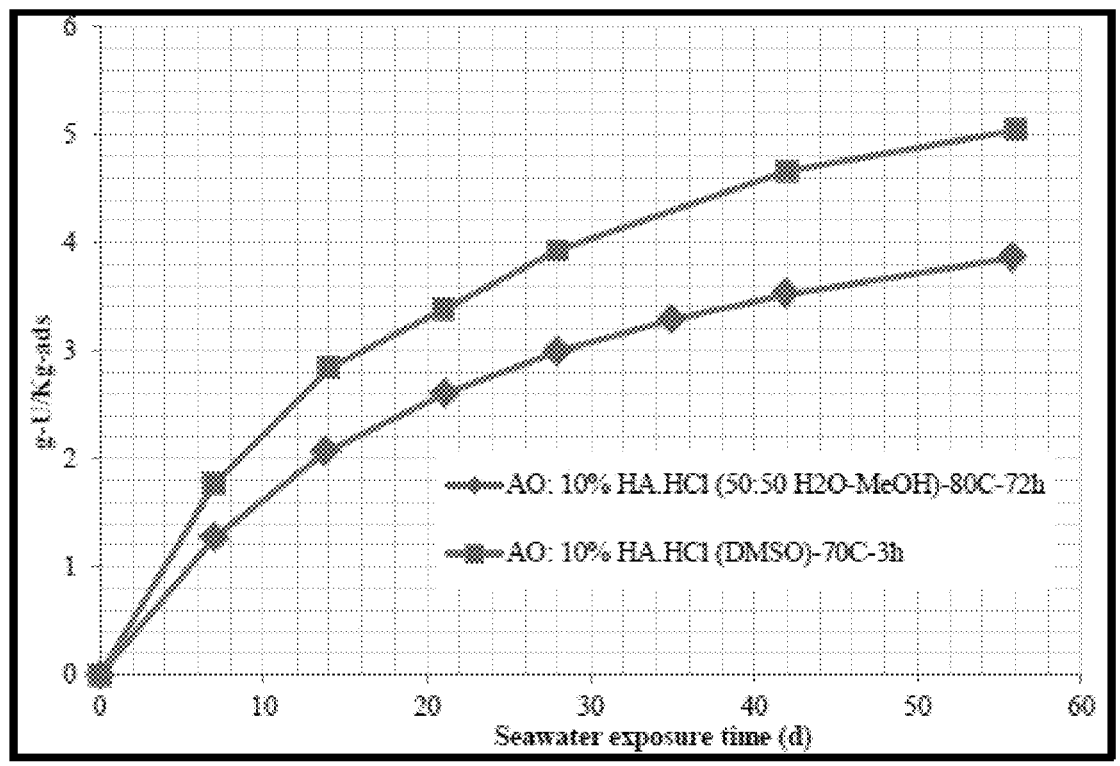
FIG. 8. Graph showing adsorption kinetics of uranium by the amidoximated AF1 adsorbents after 56 days of contact with seawater in flow-through columns.

The study of adsorption kinetics of uranium by the AF1 adsorbent amidoximated in DMSO at 70° C. for 3 hours was performed in columns using filtered seawater from Sequim Bay that was passed at a flow rate of 250-300 mL/min, at 20° C., over a period of 0-56 days. FIG. 8 illustrates the relatively faster kinetics of uranium adsorption by the adsorbent that was amidoximated in DMSO at 70° C. for 3 hours compared to the conventional AF1 adsorbent amidoximated in 50:50 (w/w) $H_2O$—$CH_3OH$ at 80° C. for 72 hours. A uranium adsorption capacity of 5.00±0.15 g U/kg-ads was reached by the DMSO-amidoximated adsorbent after 56 days of exposure in seawater. Notably, the DMSO-amidoximated adsorbent exhibited a 30% enhancement in uranium adsorption capacity over the conventional AF1 adsorbent (3.86 g-U/kg-ads). Based on the data in FIG. 8, a one-site ligand saturation model shows a half-saturation time of 22.9±1.7 days for the AF1 adsorbent that was amidoximated in DMSO at 70° C. for 3 hours, which is very similar to the conventional AF1 adsorbent (22.8±1.90 days), and has a maximum capacity of 7.05 g-U/kg adsorbent.

CONCLUSIONS

The AF1 adsorbent produced from acrylonitrile and itaconic acid was prepared by electron beam-induced graft polymerization onto high surface area polyethylene fibers. In searching for the optimum amidoximation reactions parameters, the conversion of grafted CN groups into AO groups was conducted in a variety of solvents, including de-ionized water, methanol, IPA, DMSO, 50/50 (w/w) water-methanol, 50/50 (w/w) water-IPA, 20/80 (w/w) water-THF, 50/50 (w/w) water-THF, and 50/50 (w/w) water-DMSO, at different temperatures. FTIR studies revealed that the conversion reaction was slow in methanol medium. The $^{13}C$ CP/MAS spectra of AF1 adsorbent fibers amidoximated in 50/50 (w/w) water-methanol and in DMSO clearly demonstrated the formation of open-chain amidoxime and cyclic imide dioxime. Formation of imide dioxime from amidoxime was found to occur slowly and gradually with increasing reaction time. Screening of the amidoximated samples after 24 hours of contact with Na-based brine that was spiked with 8 ppm uranium showed that the uranium adsorption capacity gradually increased with amidoximation time in the water-based solvents with methanol, IPA, and THF, and the highest uranium adsorption capacity was observed for the samples that were amidoximated in DMSO. The performance of the adsorbents after exposure in natural seawater in the flow-through-columns was consistent with the laboratory screening results and the AF1 samples amidoximated in DMSO at 70° C. for 3 hours resulted in the highest uranium adsorption capacity. Without being bound by theory, it is possible that a higher diffusivity of DMSO as compared to $H_2O/CH_3OH$ in the grafted hollow-gear trunk PE fiber results in: (i) faster kinetics of amidoximation reaction and (ii) a larger amount of cyclic imide dioxime throughout the adsorbent; and imide dioxime likely plays an important role, directly or indirectly, to enhance the uranium adsorption from seawater. The kinetics of uranium adsorption in seawater was much faster for the sample amidoximated in DMSO at 70° C. for 3 hours as compared to that in 50:50 (w/w) $H_2O/CH_3OH$ at 80° C. for 72 hours. The AF1 samples amidoximated in DMSO at 70° C. for 3 hours captured 5.00±0.15 g U/kg-ads after 56 days of exposure in seawater, which is a ~30% enhancement in uranium adsorption capacity over the conventional AF1 adsorbent.

While there have been shown and described what are at present considered the preferred embodiments of the invention, those skilled in the art may make various changes and modifications which remain within the scope of the invention defined by the appended claims.

What is claimed is:

1. A method for extracting metal ions from a liquid solution containing metal ions, the method comprising contacting said liquid solution with a functionalized material useful in absorbing metal ions from aqueous solutions, the functionalized material produced by a method comprising:
   (i) providing a precursor material having nitrile groups appended to its surface, wherein said precursor material is produced by graft co-polymerization of a nitrile-containing vinylic monomer and itaconic acid, thereby producing a precursor material having nitrile groups and carboxylic acid groups derived from itaconic acid on the surface of the precursor material; and
   (ii) reacting said nitrile groups with hydroxylamine or a derivative thereof in the presence of a polar aprotic solvent having a boiling point of at least 100° C., at a temperature of 60-80° C. for at least 1 hour, to convert at least a portion of said nitrile groups to amidoxime and imide dioxime groups, followed by reaction with a base to hydrolyze any remaining nitrile groups to carboxylic acid groups;

wherein said functionalized material has a higher uranium absorption capacity than a functionalized material produced under same conditions except that the nitrile groups are reacted with hydroxylamine or a derivative thereof in only a protic solvent.

2. The method of claim 1, wherein said imide dioxime groups are present in higher concentration as compared to a functionalized material produced by reacting said nitrile groups under the conditions provided in step (ii) of claim 1 except that a temperature of less than 60° C. is used.

3. The method of claim 1, wherein said metal ions are selected from at least one of transition, lanthanide, and actinide metal ions.

4. The method of claim 3, wherein said metal ions comprise uranium ions.

5. The method of claim 1, wherein said liquid solution is seawater.

6. The method of claim 1, wherein said precursor material has a fibrous shape, thereby producing a functionalized fiber useful in the absorption of metal ions from aqueous solutions.

* * * * *